United States Patent Office 3,132,976
Patented May 12, 1964

3,132,976
SOLID PROPELLANT COMPOSITIONS CONTAINING POLYURETHANE RESINS
Karl Klager, Richard D. Geckler, and Richard L. Parrette, Sacramento, Calif., assignors to Aerojet-General Corporation, Azusa, Calif., a corporation of Ohio
No Drawing. Filed July 20, 1959, Ser. No. 829,182
17 Claims. (Cl. 149—19)

This invention relates to novel solid propellant compositions and in particular to novel propellant compositions comprising a polyurethane binder with a finely divided oxidizing agent dispersed therein.

Solid propellant compositions are ordinarily composed of a resin fuel and an oxidizing material, the oxidizing material being intimately dispersed in the fuel. The ignition and burning properties of such propellant compositions, as well as their physical properties, are dependent to a large extent upon the particular resins employed as fuels.

In the novel propellant compositions of this invention polyurethanes are used as the resin fuel component to produce propellants of unexpectedly superior physical properties and performance characteristics. Our novel polyurethane propellants have substantially no internal strains due to the fact that there is little shrinkage and low heat of reaction during polymerization of the polyurethane fuel component. This lack of internal strain is important in that it assures substantial freedom of the propellant grain from cracking during burning. As those skilled in the art realize, propellant cracking is highly undesirable and dangerous and can result in erratic burning or even explosion of the propellant grain.

In addition to their freedom from cracking, the polyurethane propellants of this invention are superior in other ways. For example, they are possessed of sufficiently tenacious adhesive properties to enable them to be bonded directly to the rocket chamber lining, thus permitting optimum utilization of the available space in the rocket motor and simplifying manufacturing techniques. The novel polyurethane propellants of our invention are also possessed of many other desirable physical properties for example: rubbery mechanical qualities, low brittle point, excellent resilience and superior aging properties.

Our novel solid propellants can be used as the primary propulsion source in rocket-propelled vehicles or as a propellant for artillery missiles. When used as the primary propulsion source for rocket vehicles, they can be conveniently ignited by a conventional igniter, as for example, the igniter disclosed in assignee's copending application Serial No. 306,030, filed August 23, 1952 now, Patent No. 3,000,312. The propellant is preferably cast directly in the rocket chamber in which it is to be fired and restricted on one or both ends in the conventional manner with a relatively slow burning inert resin, such as a polyurethane or a polyester resin. The restriction is preferably accomplished by applying a relatively thin coating of the inert resin to the inner surfaces of the rocket chamber lining prior to casting the propellant therein. Rocket chambers such as those in which our novel solid propellants are employed are ordinarily of the conventional type having one end open and leading into a venturi rocket nozzle. Upon ignition, large quantities of gases are produced and exhausted through the nozzle creating propulsive force.

The polyurethane binders of our invention are prepared by reacting a compound having two active hydrogen groups capable of reacting with an isocyanate with an organic compound having as the sole reacting groups, two isocyanate or isothiocyanate groups. The compound having the active hydrogen groups is preferably an organic compound having as the sole reacting groups, hydroxyl or thiol groups.

It will be appreciated that in any given batch of propellant the individual polyurethane molecules may vary in length from several to tens of thousands of repeating units, hence molecular weight figures on polyurethanes represent statistical averages. The exact nature of the terminal groupings is not known and will vary depending upon whether plasticizers, polymerization catalysts, etc., are present. Moreover a given molecule may even form a ring and thus leave no dangling radicals.

It is evident from the above that a wide variety of polyurethane binders for the propellants of this invention can be prepared simply by varying the particular isocyanate and hydroxy starting materials.

The isocyanate starting materials for our polyurethane binders are diisocyanate compounds which can be saturated or unsaturated; aliphatic or aromatic; open or closed chain; and, if the latter, monocyclic or polycyclic; and substituted or not by groups substantially unreactive with isocyanate or hydroxyl groups, such as, for example, ketone, halogen, ester, sulfide or ether groups. The following diisocyanate compounds are particularly suitable as reactant for the preparation of binders for our novel polyurethane propellants.

(a) Alkane diisocyanates such as:
Ethylene diisocyanate;
Trimethylene diisocyanate;
Propylene-1,2-diisocyanate;
Tetramethylene diisocyanate;
Butylene-1,3-diisocyanate;
Decamethylene diisocyanate;
Octadecamethylene diisocyanate;
etc.

(b) Alkene diisocyanates such as:
1-propylene-1,2-diisocyanate;
2-propylene-1,2-diisocyanate;
1-butylene-1,2-diisocyanate;
3-butylene-1,2-diisocyanate;
1-butylene-1,3-diisocyanate;
1-butylene-2,3-diisocyanate;
etc.

(c) Alkylidene diisocyanates such as:
Ethylidene diisocyanate;
Propylidene-1,1-diisocyanate;
Propylidene-2,2-diisocyanate;
etc.

(d) Cycloalkylene diisocyanates such as:
Cyclopentylene-1,3-diisocyanate;
Cyclohexylene-1,2-diisocyanate;
Cyclohexylene-1,3-diisocyanate;
Cyclohexylene-1,4-diisocyanate;
etc.

(e) Cycloalkylidene diisocyanates such as:
Cyclopentylidene diisocyanates;
Cyclohexylidene diisocyanate;
etc.

(f) Aromatic diisocyanates such as:
m-Phenylene diisocyanate;
o-Phenylene diisocyanate;
p-Phenylene diisocyanate;
1-methyl-2,4-phenylene diisocyanate;
Naphthylene-1,4-diisocyanate;
Diphenylene-4,4'-diisocyanate;
2,4-tolylene diisocyanate;
2,6-tolylene diisocyanate;
4,4'-diphenylmethane diisocyanate;
1,5-naphthalene diisocyanate;
Methylene-bis-(4-phenylisocyanate);
2,2-propylene-bis-(4-phenylisocyanate);
Xylene-1,4-diisocyanate;

Xylylene-1,3-diisocyanate;
4,4'-diphenylenemethane diisocyanate;
4,4'-diphenylenepropane diisocyanate;
etc.

(g) Diisocyanates containing hetero-atoms such as
OCN—CH₂CH₂—O—CH₂CH₂—NCO;
2,3-pyridine diisocyanate;
etc.

The hydroxy starting materials for our polyurethane binders are dihydroxy compounds having the general formula: HO—R—OH, where R is a divalent organic radical. The hydroxy groups on the above compounds can be of any type suitable for the urethane reaction with isocyanate groups such as, for example, alcohol or phenolic groups. The following dihydroxy compounds are particularly suitable as reactants for the polyurethane binders of this invention.

(1) Alkane diols having a chain length of from 2 to 20 carbon atoms, inclusive, such as:
    2,2-dimethyl-1,3-propanediol
    Ethylene glycol
    Tetramethylene glycol
    Hexamethylene glycol
    Octamethylene glycol
    Decamethylene glycol
    etc.
(2) Alkene diols such as:
    1-propylene-1,2-diol
    2-propylene-1,3-diol
    1-butylene-1,2-diol
    3-butylene-1,2-diol
    1-hexylene-1,3-diol
    1-butylene-2,5-diol
    etc.
(3) Cycloalkylene diols such as:
    Cyclopentylene-1,3-diol;
    Cyclohexylene-1,2-diol;
    Cyclohexylene-1,3-diol;
    Cyclohexylene-1,4-diol;
    etc.
(4) Aromatic diols such as:
    Catechol;
    Resorcinol;
    Quinol;
    1-methyl-2,4-benzenediol;
    2-methyl-1,3-naphthalenediol;
    2,4-toluenediol;
    Xylylene-1,4-diol;
    Xylylene-1,3-diol;
    1,5-naphthalenedimethanol;
    2-ethyl-1-phenyl-3-butene-1,2-diol;
    2,2-di(4-hydroxyphenyl) propane;
    etc.
(5) Diols containing hetero atoms such as:
    Di(β-hydroxyethyl) ether;
    6-methyl-2,4-pyrimidinediol;

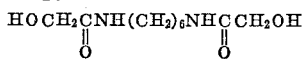

etc.

Other dihydroxy compounds suitable for the polyurethane reaction of this invention are polyesters such as those obtained from the reaction of a dihydric alcohol such as ethylene glycol, diethylene glycol, propylene glycol, butylene glycol or hexamethylene glycol with a dicarboxylic acid such as succinic acid, adipic acid, sebacic acid, oxadibutyric acid, sulfodipropionic acid, and related compounds. The polyesters most suitable for purposes of this invention are those having a molecular weight from about 1000 to about 2500. In preparing polyesters such as these, the dihydric alcohol component is permitted to react with the dicarboxylic acid component to produce the polyester. Mixtures of polyesters prepared in this manner with an olefin such as styrene, vinyl acetate, or the like, are particularly suitable for purposes of this invention. The olefin does not react with any of the hydroxy groups present in the mixture, nor does it interfere in any way with the subsequent reaction between the polyester hydroxyl groups and isocyanate groups in the polyurethane reaction mixture. The principal function of the olefin is to permit linkage of the polyester molecules together through addition polymerization.

The polyesters can be prepared from either saturated or unsaturated dihydric alcohols and saturated or unsaturated dicarboxylic acids. The anhydrides of any of these dicarboxylic acids can be substituted for all or part of any of them in the preparation of polyesters suitable for the polyurethane reaction of our invention. The usual and preferred manner of making suitable polyesters is to react a mixture of an unsaturated dicarboxylic acid (such as adipic acid, sebacic acid, or the like) or anhydride and a saturated or aromatic dicarboxylic acid or anhydride with a dihydric alcohol. Examples of unsaturated dicarboxylic acids which can be employed are: maleic acid, fumaric acid, citraconic acid, mesaconic acid, itaconic acid, etc.

In addition to the polyesters, polyethers such as polyethylene ether glycols, polypropylene ether glycols, other polyalkylene ether glycols, and mixtures or copolymers thereof having molecular weights of from about 400 to about 10,000 can be utilized as the dihydroxy reactants of the polyurethane reaction of this invention.

Polysulfides having two thiol groups, such as ethylene disulfide and the Thiokols produced by Thiokol Corporation, and polysulfides with glycol end groups such as those having the general formula $$HO(CH_2—CH_2—S—S)_x—CH_2CH_2OH$$

where $x$ is a whole number, are other suitable compounds for the polyurethane reaction of this invention.

It will be appreciated by those skilled in the art that mixtures of the dihydroxy compounds can be used, as well as mixtures of the diisocyanate compositions if desired.

It is well known to those skilled in the art that diisothiocyanates and dithiol compounds react to produce urethane-type products as do the diisocyanates and diol compounds. Thus, the diisothiocyanates and dithiols corresponding to any of the above-named diisocyanates and dihydroxy compounds can be employed for the preparation of binders for our novel propellants. For example, diisothiocyanates such as butylene-1,3-diisothiocyanate, ethylidene diisothiocyanate, cyclohexylene-1,2-diisothiocyanate, cyclohexylidene diisothiocyanate, p-phenylene diisothiocyanate, and xylylene-1,4-diisothiocyanate, etc., react with dithiol compounds such as decamethylene dithiol, thioresorcinol, ethylene bis(thioglycolate), etc., to yield polythiourethane compounds which are suitable as binders for our novel propellant compositions. Any mixture of the diisocyanates and/or diisothiocyanates suitable as reactants for the propellant binders of this invention can be reacted with any mixture of diols and/or dithiols disclosed as suitable for the purpose, within the scope of our invention.

The oxidizers employed in the propellants of this invention can be any suitable oxidizing salt well-known to those skilled in the art. Examples of suitable oxidizers are the chromates, dichromates, permanganates, nitrates, chlorates, and perchlorates of the alkali or alkaline earth metals (such as potassium, sodium or calcium); ammonia; hydrazine; or guanidine.

The selection of the oxidizing material depends upon the specific burning properties desired in the propellant grain. Thus, where a substantially smokeless propellant is desired a non-metallic oxidizing salt such as ammonium perchlorate or ammonium nitrate should be employed rather than an oxidizing salt containing a metal such as sodium nitrate, potassium perchlorate or calcium chlorate.

Mixtures of suitable inorganic oxidizing salts can be used within the scope of our invention.

Various additives may be employed in preparing the polyurethane binders of this invention. For example, plasticizers familiar to those skilled in the art such as isodecyl pelargonate; 4-nitrazapentanonitrile; 2,2-dinitropropyl - 4 - nitrazapentanoate; di-(2-ethylhexyl) azelate; etc., as well as those commercially available as such, may be utilized. Also, catalysts for the polyurethane reaction such as triethylamine, and other tertiary amines; ferric acetylacetonate and other metal acetylacetonates such as vanadyl acetylacetonate, etc.; boron trifluoride, etc., can be employed if desired.

The polyurethane reaction may be carried out either in a suitable solvent or in the absence of a solvent. The solvent may be present in such great excess as to form a solution of the monomers or it may be used in small quantities. Suitable solvents are those in which the various ingredients of the reactant mixture are soluble, such as methyl-4-nitraza-pentanoate, dioxan, dimethylphthalate, etc.

Burning rate modifiers and other additives such as anti-oxidants, wetting agents, anti-foaming agents, etc., can be employed, if desired, in the formulation of our novel propellants. In this connection, we have discovered that copper chromite, such as the Harshaw Chemical Company product known as Cu 0202, and finely divided carbon black, such as that designated by R. T. Vanderbilt Company as P–33, when utilized in small quantities (comprising preferably not greater than about 2 percent, and for best results not greater than about 1 percent, of the total propellant weight, are useful for increasing the burning rate of the propellant. We have also found certain well-known wetting agents, such as lecithin, to be useful processing aids in the preparation of our novel propellants. A wetting agent which we have found to be particularly suitable for our purpose is that known commercially as G–2684. G–2684 is a mixture of sorbitan monooleate and polyoxyethylene esters of mixed fatty and resin acids, manufactured by Atlas Powder Company of Wilmington, Delaware. For best results, we have determined that wetting agents should be employed in proportions comprising not more than about 1 percent by weight of the total propellant composition and preferably in proportions much lower than 1 percent. Various additives other than those mentioned can, of course, be employed in minor amounts within the scope of our invention.

In preparing the novel propellants of this invention, the polyurethane polymerization can be conducted at any temperature, the only effect of temperature variation being a corresponding increase or decrease in the rate of reaction. The polymerization readily takes place at room temperature but higher temperatures increase the rate of reaction and are therefore desirable in many cases. As explained above, however, temperature is not a critical variable and accordingly temperatures lower than, as well as higher than, room temperature will effect our polymerization reaction.

In preparing the novel solid propellants of our invention, the hydroxy containing monomer is preferably mixed with the inorganic oxidizer first, after which the isocyanate containing monomer is stirred into the mass. The oxidizer is employed in finely divided form. Any catalysts or other additives employed are preferably introduced into the mixture of hydroxy containing monomer and oxidizer at the same time as the isocyanate containing monomer is added thereto and the whole mass is then mixed to uniformity. After uniform mixture has been obtained, the material is cast, extruded or compression-formed to the desired shape, and polymerization is carried out by curing at a temperature preferably within the range from about 60° to about 200° F. As pointed out above, the propellant mixture can be cast directly into a rocket chamber (lined with an inert liner material) and polymerized therein if this is desirable.

From about 45 to about 95 weight percent of oxidizer, based on the total weight of the final propellant, is preferably employed in the preparation of our novel solid propellants. The amount of binder or fuel employed therefore preferably falls within the range from about 55 to about 5 percent of the weight of the final product. The various additives in the formulation normally comprise a very small percentage of the total weight, such as, for example, not more than about 10 percent, and preferably in the order of 1 or 2 percent, thereof.

The following examples are included for purposes of illustrating the novel process and propellant compositions of our invention. Applicants wish to emphasize that these examples are intended for illustrative purposes only and that they should not be construed as limitive of the scope of the invention to the particular conditions and embodiments set forth therein.

EXAMPLE I

This example illustrates the method of preparing our novel propellant composition in which a polyester is employed as the hydroxy containing monomer of the polyurethane polymerization reaction.

An acid-free polyester resin was prepared from adipic acid, diethylene glycol, and maleic anhydride by mixing these ingredients in molar proportions equivalent to 7, 11 and 3 moles of each, respectively, and allowing the condensation to proceed to an acid number of substantially zero. The polyester resin was mixed with styrene in a weight ratio of 1:1 and finely divided ammonium perchlorate was stirred into the resulting mixture. The percentages of ammonium perchlorate and polyester-styrene fuel employed were 75 and 25 percent, respectively. To the mixture of ammonium perchlorate and polyester-styrene fuel, an equimolar quantity (based on the amount of polyester resin present) of m-tolylene diisocyanate was added.

The resultant mixture of diisocyanate, ammonium perchlorate and polyester-styrene fuel was cured to effect polymerization of the diisocyanate and the polyester component. The cured propellant was found to have a tensile strength of 1200 p.s.i. and a Shore "C" hardness of 97. The tensile strength and Shore "C" hardness of the same propellant, except for omission of the m-tolylene diisocyanate, were 650 p.s.i. and 94 respectively. Comparison of these data indicates the physical superiority of the propellant with the polyurethane binder over that with only the polyester as a binder. As those skilled in the art will appreciate, the latter propellant (polyester binder) is in itself an excellent solid propellant.

EXAMPLE II

A mixture of diethylene glycol, adipic acid and maleic anhydride in molar proportions equivalent to 1.05, 0.90, and 0.10 moles of each, respectively, was prepared and allowed to react to an acid number of substantially zero. The resulting polyester resin was mixed with m-tolylene diisocyanate, equimolar proportions of each being used, and allowed to react at ambient temperature with continuous mixing. A 9° C. temperature increase was recorded in approximately ten minutes and the resin increased in viscosity from 627 cps. to 6340 cps. but no further increase occurred after mixing for two hours at 120° F. The resulting polyurethane resin was mixed with styrene, 50 percent of each being used, to form a binder solution for a solid propellant.

Finely divided ammonium nitrate is uniformly dispersed in stoichiometric proportion in the polyurethane binder solution and the mixture is then cast and cured to produce the final propellant grain.

EXAMPLE III

Sebacic acid, propylene glycol and maleic anhydride in molar proportions equivalent to 4 moles, 5 moles and 1 mole, respectively, were mixed together to form a polyester resin. The resin was then mixed with an equal amount of styrene to form a liquid solution. Potassium perchlorate, finely divided carbon black and t-butyl hydroperoxide were added to the styrene-polyester solution and the whole stirred to a uniform mass. The potassium perchlorate, carbon black and t-butyl hydroperoxide were added in proportions equivalent to 74, 1.00 and 0.15 percent of the final mixture, respectively, and as oxidizer, burning rate modifier and polymerization catalyst, respectively.

To the above described mixture, one percent of m-tolylene diisocyanate was added and the resulting mixture was cured at 185° F. The tensile strength of the cured propellant grain was found to average 1300 p.s.i. at 60° F.

For comparative purposes, the tensile strength of the propellant without the addition of the m-tolylene diisocyanate (and attendant polyurethane formation) has been found to have a tensile strength of from about 700 to about 800 p.s.i. Comparison of the tensile strength of the propellant with and without the m-tolylene diisocyanate illustrates the substantial improvement in strength of the former over the latter which is an excellent propellant charge for rocket motors. Propellants of the latter type, in which the binder is a polyester resin, are more fully disclosed in assignee's copending U.S. patent application, Serial No. 109,409, filed August 9, 1949, now Patent No. 3,079,648.

EXAMPLE IV

A mixture of diethylene glycol, adipic acid and maleic anhydride in molar proportions equivalent to 1.05, 0.90, and 0.10 moles of each, respectively, was allowed to react until the acid number of the mixture was substantially zero. The resulting polyester was then mixed with n-butyl acrylate and methyl acrylate to make a fuel mixture, the proportions of n-butyl acrylate, polyester and methyl acrylate being 65, 25, and 10 percent by weight, respectively. The fuel mixture was mixed with finely divided ammonium perchlorate to form a dispersion containing 80 percent ammonium perchlorate and 20 percent by weight, fuel.

An equimolar quantity of m-tolylene diisocyanate (based on the calculated molecular weight of the polyester component of the mixture) was added to the oxidizer-fuel dispersion and the total mass was then cured to form the final propellant grain.

The following are additional examples of propellant formulations within the scope of our invention. The formulations are prepared in the same manner as the propellants described in the previous examples and by the general method described above.

EXAMPLE V

Ingredients:

| | Weight percent |
|---|---|
| Resin— | |
|   m-Phenylene diisocyanate _____ 11.22 | |
|   Hexamethylene glycol _____ 8.01 | 19.23 |
| Ammonium perchlorate _____ | 80.00 |
| Lecithin _____ | 0.05 |
| Ferric acetylacetonate _____ | 0.02 |
| P–33 carbon black _____ | 0.50 |
| Copper chromite (Cu 0202) _____ | 0.20 |
| | 100.00 |

EXAMPLE VI

Ingredients:

| | Weight percent |
|---|---|
| Resin— | |
|   2,2-bis(4-hydroxyphenyl) propane ___ 6.78 | |
|   Decamethylene diisocyanate _____ 6.75 | 13.53 |
| Ammonium perchlorate _____ | 82.00 |
| Di-2-ethylhexyl azelate _____ | 3.37 |
| Lecithin _____ | 0.06 |
| Ferric acetylacetonate _____ | 0.04 |
| P–33 carbon black _____ | 0.50 |
| Copper chromite (Cu 0202) _____ | 0.50 |
| | 100.00 |

EXAMPLE VII

Ingredients:

| | |
|---|---|
| Resin— | |
|   $HOCH_2\overset{O}{\overset{\|}{C}}NH(CH_2)_6NH\overset{O}{\overset{\|}{C}}CH_2OH$ _____10.90 | |
|   Decamethylene diisocyanate _____ 10.57 | 21.47 |
| Ammonium nitrate _____ | 76.00 |
| Di-2-ethylhexyl azelate _____ | 2.39 |
| Lecithin _____ | 0.09 |
| Triethylamine _____ | 0.05 |
| | 100.00 |

EXAMPLE VIII

Ingredients:

| | |
|---|---|
| Resin— | |
|   Decamethylene dithiol _____ 9.25 | |
|   Decamethylene diisocyanate _____ 10.05 | 19.30 |
| Sodium nitrate _____ | 80.00 |
| Boron trifluoride _____ | 0.70 |
| | 100.00 |

EXAMPLE IX

Ingredients:

| | |
|---|---|
| Resin— | |
|   Decamethylene glycol _____ 7.91 | |
|   Hexamethylene diisothiocyanate _____ 9.09 | 17.00 |
| Ammonium perchlorate _____ | 82.00 |
| Vanadyl acetylacetonate _____ | 1.00 |
| | 100.00 |

EXAMPLE X

Ingredients:

| | |
|---|---|
| Resin— | |
|   Decamethylene dithiol _____ 12.10 | |
|   Hexamethylene diisothiocyanate ____ 11.76 | 23.86 |
| Potassium permanganate _____ | 76.00 |
| Lecithin _____ | 0.09 |
| Ferric acetylacetonate _____ | 0.05 |
| | 100.00 |

EXAMPLE XI

Ingredients:

| | |
|---|---|
| Resin— | |
|   Decamethylene glycol _____ 8.27 | |
|   Decamethylene diisocyanate _____ 10.63 | 18.90 |
| Ammonium perchlorate _____ | 80.00 |
| P–33 carbon black _____ | 0.60 |
| Copper chromite (Cu 0202) _____ | 0.50 |
| | 100.00 |

EXAMPLE XII

Ingredients:

| | |
|---|---|
| Resin— | |
|   Di($\beta$-hydroxyethyl) ether _____ 6.53 | |
|   Hexamethylene diisocyanate _____ 10.37 | 16.90 |
| Potassium nitrate _____ | 82.00 |
| P–33 carbon black _____ | 0.10 |
| 2,2-dinitropropyl-4-nitrazapentanoate _____ | 1.00 |
| | 100.00 |

EXAMPLE XIII

Ingredients:
- Resin— — Weight percent
  - Resorcinol _____ 9.18
  - m-Phenylene diisocyanate _____ 13.32 — 22.50
- Sodium perchlorate _____ 77.00
- Lecithin _____ 0.50

100.00

EXAMPLE XIV

Ingredients:
- Resin—
  - Cyclohexanediol-1,4 _____ 6.87
  - Hexamethylene diisocyanate _____ 10.03 — 16.90
- Potassium chlorate _____ 82.00
- Copper chromite (Cu 0202) _____ 1.10

100.00

EXAMPLE XV

Ingredients:
- Resin—
  - Polyethylene ether glycol (M.W.[1] 1540) _____ 10.19
  - 2,4-tolylene diisocyanate _____ 4.88 — 15.07
- Ammonium nitrate _____ 80.00
- Isodecyl pelargonate _____ 3.78
- Atlas G-2684 _____ 0.05
- Lecithin _____ 0.06
- Ferric acetylacetonate _____ 0.04
- Copper chromite _____ 1.00

100.00

[1] Average molecular weight.

EXAMPLE XVI

Ingredients:
- Resin—
  - Polyethylene ether glycol (M.W. 1000) _____ 13.91
  - 2,4-tolylene diisocyanate _____ 7.59 — 21.50
- Ammonium perchlorate _____ 76.00
- Ferric acetylacetonate _____ 0.05
- Lecithin _____ 0.05
- G-2684 _____ 0.04
- Di-(2-ethylhexyl) azelate _____ 2.36

100.00

EXAMPLE XVII

Ingredients:
- Resin—
  - Polypropylene ether glycol (M.W. 1025) _____ 10.80
  - 2,4-tolylene diisocyanate _____ 5.65 — 16.45
- Ammonium perchlorate _____ 80.00
- Lecithin _____ 0.05
- G-2684 _____ 0.04
- Di-(2-ethylhexyl) azelate _____ 2.46
- Copper chromite _____ 1.00

100.00

EXAMPLE XVIII

Ingredients:
- Resin—
  - Polyethylene ether glycol (M.W. 4000) _____ 11.53
  - 2,4-tolylene diisocyanate _____ 5.77 — 17.30
- Ammonium perchlorate _____ 80.00
- Vanadyl acetylacetonate _____ 0.01
- Lecithin _____ 0.05
- G-2684 _____ 0.04
- Di-(2-ethylhexyl) azelate _____ 2.60

100.00

EXAMPLE XIX

Ingredients:
- Resin—
  - n - Butylene ether glycol (M.W. 10,000) _____ 12.13
  - 2,4-tolylene diisocyanate _____ 3.23 — 15.36
- Potassium perchlorate _____ 80.00
- Ferric acetylacetonate _____ 0.02
- Lecithin _____ 0.05
- G-2684 _____ 0.04
- Di-(2-ethylhexyl) azelate _____ 3.83
- Copper chromite _____ 0.20
- P-33 carbon black _____ 0.50

100.00

EXAMPLE XX

Ingredients:
- Resin—
  - Ethylene glycol _____ 4.24
  - m-Phenylene diisocyanate _____ 11.64 — 15.88
- Ammonium nitrate _____ 80.00
- Ferric acetylacetonate _____ 0.05
- Lecithin _____ 0.06
- G-2684 _____ 0.05
- DC-200[1] (silicone oil; anti-foaming agent)__ 0.01
- Di-(2-ethylhexyl) azelate _____ 3.95

100.00

[1] Dow Corning Co.

EXAMPLE XXI

Ingredients:
- Resin—
  - Triethylene glycol _____ 8.7
  - m-Phenylene diisocyanate _____ 8.7 — 17.4
- Potassium perchlorate _____ 12.3
- Ammonium perchlorate _____ 69.7
- Copper chromite (Cu 0202) _____ 0.1
- P-33 carbon black _____ 0.5

100.0

EXAMPLE XXII

Ingredients:
- Resin—
  - 1,4-butanediol _____ 5.5
  - Octamethylene diisocyanate _____ 11.9 — 17.4
- Ammonium perchlorate _____ 69.7
- Potassium perchlorate _____ 12.3
- P-33 carbon black _____ 0.6

100.0

EXAMPLE XXIII

Ingredients:
- Resin—
  - Hydroquinonediglycol ether _____ 8.96
  - Octamethylene diisocyanate _____ 8.94 — 17.90
- Ammonium perchlorate _____ 82.00
- P-33 carbon black _____ 0.10

100.00

EXAMPLE XXIV

Ingredients:
- Resin—
  - Transhexahydroxylylene glycol _____ 9.51
  - Octamethylene diisocyanate _____ 12.99 — 22.50
- Ammonium perchlorate _____ 77.00
- P-33 carbon black _____ 0.50

100.00

EXAMPLE XXV

Ingredients:
- Resin—
  - 1.4-butylene glyocol _____ 5.92
  - Heptamethylene diisocyanate _____ 11.98 — 17.90
- Ammonium perchlorate _____ 69.70
- Potassium perchlorate _____ 12.30
- Copper chromite _____ 0.10

100.00

In carrying out the various steps involved in the preparation of our novel solid propellants, equipment, and techniques well-known to those skilled in the art can be employed. For example, where mixtures which are liquids or relatively thin slurries are to be prepared, the necessary mixing or stirring can easily be accomplished by means of such conventional equipment as paddle stirrers or the like. Where the mixtures are thick and viscous, various mixers or kneaders conventionally used on materials of this nature can be employed. We have found, for example, that sigma blade kneaders are particularly suitable for the purpose. The preparation of our novel propellants can be carried out either as a batch or as a continuous process.

We claim:
1. A solid propellant composition consisting essentially of a cured intimate mixture of a solid inorganic oxidizing salt and a resin binder consisting essentially of the reaction product of a compound having two active hydrogen groups capable of reacting with an isocyanate, selected from the group consisting of:
   (a) alkane diols having a chain length of from 2 to 20 carbon atoms, inclusive;
   (b) alkane dithiols having a chain length of from 2 to 20 carbon atoms;
   (c) alkene diols;
   (d) alkene dithiols;
   (e) cycloalkylene diols;
   (f) cycloalkylene dithiols;
   (g) aromatic diols;
   (h) aromatic dithiols;
   (i) dihydroxy polyesters having a molecular weight from about 1000 to about 2500;
   (j) polyalkylene ether glycols having a molecular weight from about 400 to about 10,000;
   (k) polysulfides with glycol end groups; and mixtures thereof,
and a compound selected from the group consisting of:
   (1) alkane diisocyanates;
   (2) alkane diisothiocyanates;
   (3) alkene diisocyanates;
   (4) alkene diisothiocyanates;
   (5) alkylidene diisocyanates;
   (6) alkylidene diisothiocyanates;
   (7) cycloalkylene diisocyanates;
   (8) cycloalkylene diisothiocyanates;
   (9) cycloalkylidene diisocyanates;
   (10) cycloalkylidene diisothiocyanates;
   (11) aromatic diisocyanates;
   (12) aromatic diisothiocyanates;
      and mixtures thereof, said solid inorganic oxidizing salt being present in an amount between about 45 and about 95 percent by weight of the propellant composition, and said resin binder being present in an amount between about 55 and about 5 percent by weight of the propellant composition.

2. A solid propellant composition consisting essentially of a cured intimate mixture of a solid inorganic oxidizing salt and a resin binder consisting essentially of the reaction product of an alkane diisocyanate and a dihydroxy polyester having a molecular weight from about 1000 to about 2500, the inorganic oxidizing salt being present in an amount between about 45 and about 95 percent by weight of the propellant composition and the resin binder being present in an amount between about 55 and about 5 percent by weight of the propellant composition.

3. A solid propellant composition consisting essentially of a cured intimate mixture of a solid inorganic oxidizing salt and a resin binder consisting essentially of the reaction product of an aromatic diisocyanate and an alkane diol having a chain length from 2 to 20 carbon atoms, inclusive, the inorganic oxidizing salt being present in an amount between about 45 and about 95 percent by weight of the propellant composition and the resin binder being present in an amount between about 55 and about 5 percent by weight of the propellant composition.

4. A solid propellant composition consisting essentially of a cured intimate mixture of a solid inorganic oxidizing salt and a resin binder consisting essentially of the reaction product of an alkane diisocyanate and an alkane diol having a chain length from 2 to 20 carbon atoms, inclusive, the inorganic oxidizing salt being present in an amount between about 45 and about 95 percent by weight of the propellant composition and the resin binder being present in an amount between about 55 and about 5 percent by weight of the propellant composition.

5. A solid propellant composition consisting essentially of a cured intimate mixture of a solid inorganic oxidizing salt and a resin binder consisting essentially of the reaction product of an aromatic diisocyanate and a polyalkylene ether glycol having a molecular weight from about 400 to about 10,000, the inorganic oxidizing salt being present in an amount between about 45 and about 95 percent by weight of the propellant composition and the resin binder being present in an amount between about 55 and about 5 percent by weight of the propellant composition.

6. The solid propellant composition of claim 1 wherein the inorganic oxidizing salt is ammonium perchlorate.

7. The solid propellant composition of claim 1 wherein the inorganic oxidizing salt is ammonium nitrate.

8. The solid propellant composition of claim 1 wherein the inorganic oxidizing salt is potassium perchlorate.

9. The solid propellant composition of claim 1 wherein the inorganic oxidizing salt is a mixture of perchlorates.

10. The solid propellant composition of claim 1 in which there is intimately dispersed an amount not greater than about 2 percent by weight of the propellant composition, of a burning rate additive.

11. The solid propellant composition of claim 1 in which there is intimately dispersed an amount of carbon black not greater than about 2 percent by weight of the propellant composition, as a burning rate accelerator.

12. The solid propellant composition of claim 1 in which there is intimately dispersed an amount of copper chromite not greater than about 2 percent by weight of the propellant composition, as a burning rate accelerator.

13. The solid propellant composition of claim 1 in which there is intimately dispersed an amount not greater than about 2 percent by weight of the propellant composition of a burning rate accelerator mixture of finely divided carbon black and copper chromite.

14. The solid propellant composition of claim 1 wherein the inorganic oxidizing salt is present in an amount between about 70 and about 90 percent by weight of the propellant composition and the resin binder is present in an amount between about 30 and about 10 percent by weight of the propellant composition.

15. The method of preparing a solid propellant composition which comprises intimately dispersing from about 45 to about 95 percent by weight of a solid inorganic oxidizing salt in about 55 to about 5 percent by weight of a binder mixture consisting essentially of a compound having two active hydrogen groups capable of reacting with an isocyanate selected from the group consisting of:
   (a) alkane diols having a chain length of from 2 to 20 carbon atoms, inclusive;
   (b) alkane dithiols having a chain length of from 2 to 20 carbon atoms;
   (c) alkene diols;
   (d) alkene dithiols;
   (e) cycloalkylene diols;
   (f) cycloalkylene dithiols;
   (g) aromatic diols;
   (h) aromatic dithiols;
   (i) dihydroxy polyesters having a molecular weight from about 1000 to about 2500;

(j) polyalkylene ether glycols having a molecular weight from about 400 to about 10,000;

(k) polysulfides with glycol end groups; and mixtures thereof, and a compound selected from the group consisting of:
(1) alkane diisocyanates;
(2) alkane diisothiocyanates;
(3) alkene diisocyanates;
(4) alkene diisothiocyanates;
(5) alkylidene diisocyanates;
(6) alkylidene diisothiocyanates;
(7) cycloalkylene diisocyanates;
(8) cycloalkylene diisothiocyanates;
(9) cycloalkylidene diisocyanates;
(10) cycloalkylidene diisothiocyanates;
(11) aromatic diisocyanates;
(12) aromatic diisothiocyanates; and mixtures thereof; and curing the mixture.

16. The method of claim 15 wherein the inorganic oxidizing salt is employed in an amount between about 70 and about 90 percent by weight of the propellant composition and the binder mixture is employed in an amount between about 30 and about 10 percent by weight of the propellant composition.

17. The method of claim 15 wherein the propellant mixture is cured in the presence of a polymerization catalyst.

References Cited in the file of this patent

UNITED STATES PATENTS 2,941,010   Mann et al. _____ June 14, 1960

OTHER REFERENCES

Zaehringer: Modern Plastics, vol. 34, October 1956, pp. 148–51 and 284.

Dombrow: "Polyurethanes," Reinhold Publishing Corp., New York (1957), page 4.

Zaehringer: "Solid Propellant Rockets. Second Stage," American Rocket Co., Box 1112, Wyandotte, Mich., September 1958, pp. 203–219.

Zaehringer: Missiles and Rockets, vol. 5, No. 2, January 12, 1959, pp. 16 and 17.